(12) United States Patent
Wang et al.

(10) Patent No.: US 8,705,594 B2
(45) Date of Patent: Apr. 22, 2014

(54) METHOD AND APPARATUS FOR BALANCING POWER BETWEEN ANTENNAS, AND BASE STATION

(71) Applicant: Huawei Technologies Co., Ltd., Shenzhen (CN)

(72) Inventors: Chengyi Wang, Shanghai (CN); Jinlin Zhang, Shanghai (CN); Xuan Xiao, Shanghai (CN); Fangfang Lv, Shanghai (CN); Ting Yin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/709,860

(22) Filed: Dec. 10, 2012

(65) Prior Publication Data

US 2013/0100997 A1 Apr. 25, 2013

Related U.S. Application Data

(63) Continuation of application No. PCT/CN2011/075911, filed on Jun. 20, 2011.

(30) Foreign Application Priority Data

Jun. 18, 2010 (CN) .......................... 2010 1 0207844
Jun. 16, 2011 (CN) .......................... 2011 1 0161960

(51) Int. Cl.
*H04L 5/16* (2006.01)

(52) U.S. Cl.
USPC .......................................................... 375/219

(58) Field of Classification Search
USPC .......................... 375/219, 260, 267, 295, 299; 455/456.1, 452.2
See application file for complete search history.

(56) References Cited

U.S. PATENT DOCUMENTS

| | | | |
|---|---|---|---|
| 2007/0127586 A1 | 6/2007 | Hafeez | |
| 2007/0274411 A1 | 11/2007 | Lee et al. | |
| 2009/0238290 A1* | 9/2009 | Imai et al. | 375/260 |
| 2011/0098082 A1 | 4/2011 | Kent et al. | |
| 2011/0286548 A1* | 11/2011 | Safavi et al. | 375/295 |
| 2012/0140838 A1* | 6/2012 | Kadous et al. | 375/267 |

FOREIGN PATENT DOCUMENTS

| | | |
|---|---|---|
| CN | 101174867 A | 5/2008 |
| CN | 101854712 A | 5/2008 |
| CN | 101288245 A | 10/2008 |
| CN | 101292442 A | 10/2008 |
| CN | 101297512 A | 10/2008 |

(Continued)

OTHER PUBLICATIONS

International Search Report received in International Application No. PCT/CN2011/075911, Applicant: Huawei Technologies Co., Ltd., et al., mailed Oct. 13, 2011, 17 pages.

(Continued)

*Primary Examiner* — Khai Tran
(74) *Attorney, Agent, or Firm* — Slater & Matsil, L.L.P.

(57) ABSTRACT

A method and an apparatus for balancing power between antennas, and a base station are provided. The method includes multiplying n virtual antenna signals by an orthogonal matrix to obtain n intermediate regulative signals; and using a corresponding rotary phase to rotate phases of m of the n intermediate regulative signals, so that a phase difference exists between at least two of n physical antenna signals output by antennas.

20 Claims, 8 Drawing Sheets

(56) References Cited

FOREIGN PATENT DOCUMENTS

| WO | 2008035916 A2 | 3/2008 |
|----|---------------|--------|
| WO | 2008113038 A1 | 9/2008 |
| WO | 2010018983 A2 | 2/2010 |
| WO | 2010060453 A1 | 6/2010 |

OTHER PUBLICATIONS

Written Opinion of the International Searching Authority received in International Application No. PCT/CN2011/075911, Applicant: Huawei Technologies Co., Ltd., et al., mailed Oct. 13, 2011, 6 pages.
Chinese Office Action w/Partial Translation received in Application No. 201110161960.2, Applicant: Huawei Technologies Co., Ltd., mailed Apr. 1, 2013, 10 pages.
Chinese Search Report received in Application No. 201110161960.2, Applicant: Huawei Technologies Co., Ltd., mailed Mar. 22, 2013, 3 pages.
Eltayeb, N.M., et al., "Closed-Loop Extended Orthogonal Space Frequency Block Coding Techniques for OFDM Based Broadband Wireless Access Systems," IEEE International Conference on Networks and Systems, Dec. 31, 2008, 5 pages.
Nabar, Rohit U., et al. "Transmit Optimization for Spatial Multiplexing in the Presence of Spatial Fading Correlation," IEEE Conference on Global Telecommunications, Dec. 31, 2011, pp. 131-135.
Extended European Search Report received in Application No. PCT/CN2011/075911, Applicant: Huawei Technologies Co., Ltd., mailed Sep. 5, 2013, 6 pages.

* cited by examiner

US 8,705,594 B2

METHOD AND APPARATUS FOR BALANCING POWER BETWEEN ANTENNAS, AND BASE STATION

This application is a continuation of International Application No. PCT/CN2011/075911, filed on Jun. 20, 2011, which claims priority to Chinese Patent Application No. 201010207844.5, filed on Jun. 18, 2010 and Chinese Patent Application No. 201110161960.2, filed on Jun. 16, 2011, all of which are hereby incorporated by reference in their entireties.

TECHNICAL FIELD

The present invention relates to the field of radio communications technologies, and in particular, to a method and an apparatus for balancing power between antennas, and a base station.

BACKGROUND

Wideband code division multiple access (WCDMA) opens the network interface R7 protocol, and introduces a multiple input multiple output (MIMO) technology. The MIMO technology is an enhanced version of high speed downlink packet access (HSDPA), and is designed to multiply peak throughput. In the evolution from the HSDPA to the MIMO, the same carrier is generally shared by the MIMO and the HSDPA.

When the MIMO and the HSDPA share a carrier, to avoid deterioration of the performance of the HSDPA in the transmit diversity mode, a primary/secondary pilot mode is applicable, as shown in FIG. 1. FIG. 1 is a schematic networking diagram of MIMO and HSDPA in a primary/secondary pilot mode. In FIG. 1, the MIMO, the Primary Common Pilot Channel (P-CPICH), the HSDPA, and the R99 employ a single-transmitting mode. The MIMO signals and the HSDPA signals from two power amplifiers (PAs) are carried over one carrier f1, but the R99 signals are carried over another carrier f2; moreover, PA1 has two frequencies f1 and f2, but PA2 has only one frequency f1, which leads to imbalance of power between PA1 and PA2.

In the prior art, to keep power balance between antennas when the MIMO coexists with the conventional HSDPA, the signals output from a single antenna are multiplied by an orthogonal virtual antenna mapping (VAM) matrix. In this way, the power is balanced between two PAs.

However, after all output signals are multiplied by the VAM matrix and output, the performance of the HSDPA does not fluctuate, and cannot be enhanced.

SUMMARY OF THE INVENTION

Embodiments of the present invention provide a method and an apparatus for balancing power between antennas, and a base station, and therefore, signals output by antennas generate different phases which make the performance of the HSDPA fluctuate.

The present invention is implemented based on the following technical solutions.

A method for balancing power between antennas includes multiplying n virtual antenna signals by an orthogonal matrix to obtain n intermediate regulative signals, where n is an integer that fulfills $n \geq 2$. A corresponding rotary phase is used to rotate phases of m of the n intermediate regulative signals, where m is an integer that fulfills $1 \leq m \leq n$, so that a phase difference exists between at least two of n physical antenna signals output by antennas.

An apparatus for balancing power between antennas includes a matrix processing module that is configured to multiply n virtual antenna signals by an orthogonal matrix to obtain n intermediate regulative signals, where n is an integer that fulfills $n \geq 2$. A phase rotating module is configured to use a corresponding rotary phase to rotate phases of m of the n intermediate regulative signals, where m is an integer that fulfills $1 \leq m \leq n$, so that a phase difference exists between at least two of n physical antenna signals output by antennas.

A base station is also provided, which includes the foregoing apparatus for balancing power between antennas.

In the technical solutions of the present invention, phase rotation is performed for the signals obtained as a result of multiplying the virtual antenna signals by the VAM matrix, and therefore, the signals output by the antennas generate different phases which make the performance of the HSDPA fluctuate.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

To make the objectives, technical solutions, and merits of the present invention clearer, the following describes the embodiments of the present invention in more detail with reference to the accompanying drawings.

Figure 1:
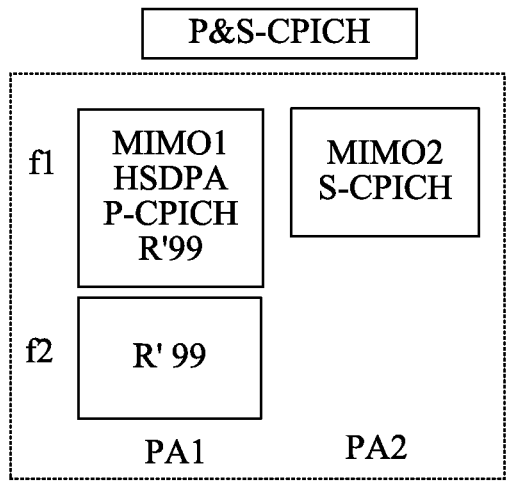
FIG. 1 is a schematic networking diagram of MIMO and HSDPA in a primary/secondary pilot mode.
Figure 2:
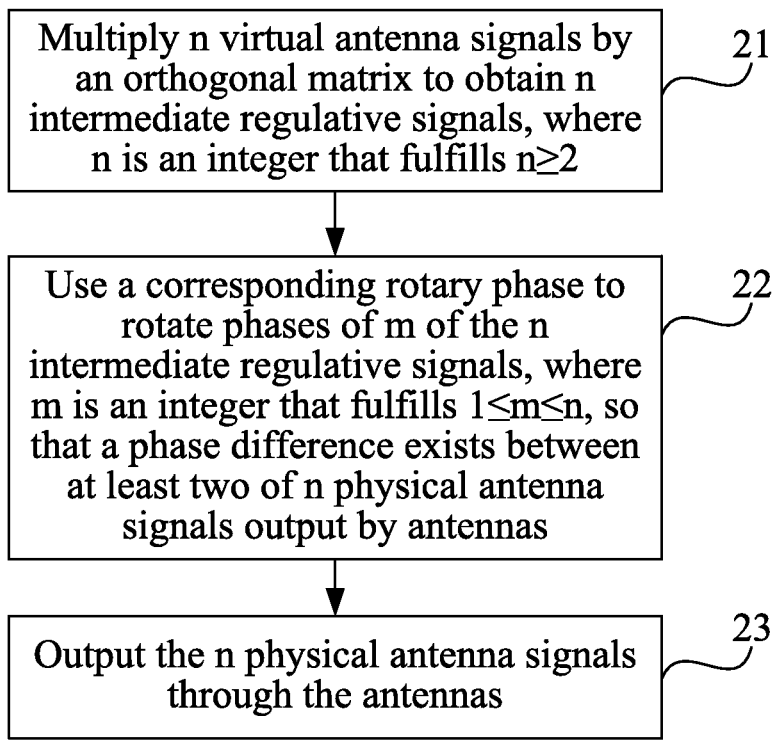
FIG. 2 is a flowchart of a method for balancing power between antennas according to an embodiment of the present invention.

FIG. 2 is a flowchart of a method for balancing power between antennas according to an embodiment of the present invention. As shown in FIG. 2, the method may include the following steps.

Step 21: Multiply n virtual antenna signals by an orthogonal matrix to obtain n intermediate regulative signals, where n is an integer that fulfills n≥2.

Figure 3:
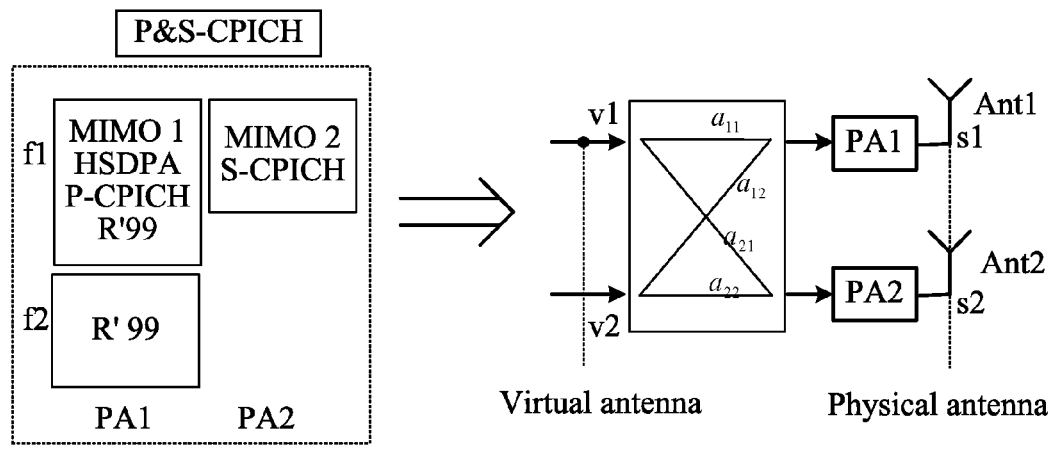
FIG. 3 is a schematic diagram of a VAM matrix applied when MIMO and HSDPA share a carrier during networking in a primary/secondary pilot mode in a method for balancing power between antennas according to an embodiment of the present invention.

As shown in FIG. 3, when MIMO and HSDPA share a carrier during networking in a primary/secondary pilot mode, a VAM matrix is applied (the VAM matrix is an example of orthogonal matrix, and the embodiment takes the VAM matrix as an example). In FIG. 3, V1 and V2 are VAM input signals, and are called virtual antenna signals.

$$VAM \text{ matrix} = \frac{\sqrt{2}}{2}\begin{pmatrix} a_{11} & a_{12} \\ a_{21} & a_{22} \end{pmatrix} = \frac{\sqrt{2}}{2}\begin{pmatrix} 1 & 1 \\ 1 & -1 \end{pmatrix};$$

S1 and S2 are PA output signals, and are called physical antenna signals. V1 and V2 are multiplied by the VAM matrix, so that the power is divided equally on two physical antennas, namely, thus the power is balanced between PA1 and PA2. The VAM matrix may be regarded as a part of the radio channel, and is invisible to the receiver. Therefore, the receiving process of user equipment (UE) needs no change.

Note that the VAM matrix may appear in various forms, and $$\frac{\sqrt{2}}{2}\begin{pmatrix} 1 & 1 \\ 1 & -1 \end{pmatrix}$$

is taken as an example of the expression of the VAM matrix in this embodiment. Moreover, in the foregoing description, it is assumed that two antennas exist. Understandably, this solution is also applicable to multi-antenna scenarios.

Step 22: Use a corresponding rotary phase to rotate phases of m of the n intermediate regulative signals, where m is an integer that fulfills 1≤m≤n, so that a phase difference exists between at least two of n physical antenna signals output by antennas.

In other words, this embodiment may rotate phases of all the intermediate regulative signals, or rotate phases of one or more of the intermediate regulative signals through the corresponding rotary phase, so long as a phase difference exists between the physical antenna signals output by the antennas. The phase difference existing between the physical antenna signals output by the antennas here may be a phase difference existing between at least two physical antenna signals.

Since a phase difference exists between the physical antenna signals output by the antennas, different phases of the output signals make the performance of the HSDPA fluctuate, and the performance of the HSDPA is improved while power balance is kept between the antennas.

Figure 4:
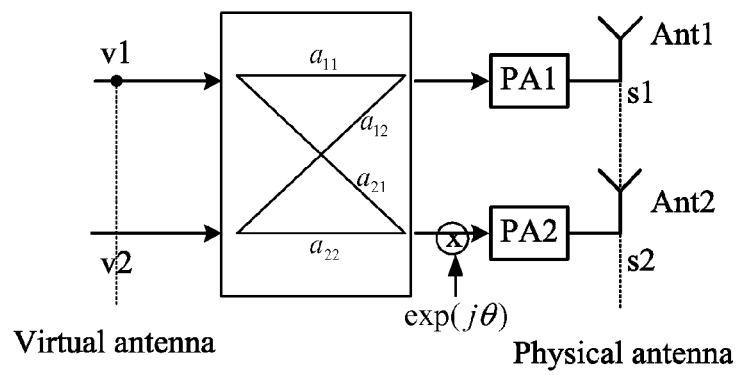
FIG. 4 is a schematic diagram of phase rotation in a method for balancing power between antennas according to an embodiment of the present invention.

In step 22 above, the phase rotation mode of the intermediate regulative signals is shown in FIG. 4, namely, m intermediate regulative signals are multiplied by $e^{j\theta_p}$, where $\theta_p$ is the rotary phase corresponding to the m intermediate regulative signals.

When m>1, different intermediate regulative signals may be rotated through different rotary phases. In this case, m intermediate regulative signals are multiplied by $e^{j\theta_p}$, where $\theta_p$ is the rotary phase corresponding to the m intermediate regulative signals, and p is the sequence number of the intermediate regulative signals, where p∈[1, m]. For example, the first intermediate regulative signal is corresponding to the rotary phase $\theta_1$, the second intermediate regulative signal is corresponding to the rotary phase $\theta_2$, ..., and the $m^{th}$ intermediate regulative signal is corresponding to the rotary phase $\theta_m$.

Note that when n>m>1, all or a part of different intermediate regulative signals may be rotated through the same rotary phase.

Further, the phase used for phase rotation may keep updating within a 2π range, so as to accomplish better performance. Specifically, the method for balancing power between antennas in this embodiment may further include: updating the value of $\theta_p$ within a 2π period, and subsequently, using the updated $\theta_p$ to rotate the phases of the m intermediate regulative signals.

The mode of updating the value of $\theta_p$ may be: $\theta_p$=phase of previous phase rotation+2π/PhaseNum, where PhaseNum is the number of times for updating the value of $\theta_p$ within a preset 2π period. For details, see the embodiment shown in FIG. 5.

Further, if the number of times for updating the value of $\theta_p$ within a 2π period is less than PhaseNum, it is appropriate to continue to update the value of $\theta_p$.

Further, the method in this embodiment may further include the following steps.

Step 23: Output the n physical antenna signals through the antennas.

When m<n, the physical antenna signals include the intermediate regulative signals whose phase is not rotated.

The method for balancing power between antennas in this embodiment may further include: collecting channel quality indications (CQIs) generated by phase rotation, and selecting and locking an optimum phase for performing phase rotation. This operation may include the following steps.

Step 1: Obtain CQI statistic values for locking determination reported by the UE under each phase. For example, average the CQIs reported under the same rotary phase in at least one 2π period to obtain a CQI average value under the same rotary phase, and filter the CQI average value under the same rotary phase to obtain the CQI statistic values for locking determination under different rotary phases.

Step 2: Find a maximum CQI statistic value among the obtained CQI statistic values for locking determination. For example, find the maximum CQI statistic value among the CQI statistic values for locking determination which are obtained according to all the phases for phase rotation in the current 2π period.

Step 3: Dtemine whether to lock the phase corresponding to the maximum CQI statistic value by using the CQI statistic values for locking determination. For example, find the optimum phase according to the maximum CQI statistic value, where the optimum phase is the phase corresponding to the maximum CQI statistic value; average the CQI statistic values for locking determination under different rotary phases within the current 2π period to obtain a first mean value; average the CQI statistic values for locking determination under phases whose index falls within [index of the optimum phase minus the number of times for updating the value of $\theta_p$ in a 2π period/4, index of the optimum phase plus the number of times for updating the value of $\theta_p$ in a 2π period/4] to obtain a second mean value; average CQI statistic values for non-locking determination which are obtained according to all the phases for phase rotation to obtain a third mean value; average the CQI statistic values for non-locking determination under phases whose index falls within [index of the optimum phase minus the number of times for updating the value of $\theta_p$ in a 2π period/4, index of the optimum phase plus the number of times for updating the value of $\theta_p$ in a 2π period/4] to obtain a fourth mean value; and determine whether to lock the optimum phase according to the first mean value, the second mean value, the third mean value, and the fourth mean value. Specifically, lock the optimum phase if a difference between the fourth mean value and the third mean value is greater than a non-locking state determination threshold, a difference between the second mean value and the first mean value is greater than a locking state determination threshold, and a difference between the fourth mean value and the third mean value is greater than the locking state determination threshold.

When the optimum phase is locked, the locked optimum phase may be used to rotate the phases of the m intermediate regulative signals continuously in the subsequent process, so as to further enhance the performance of the HSDPA. For details, see the embodiment shown in FIG. 6.

In the technical solution disclosed above, phase rotation is performed for the signals obtained as a result of multiplying the virtual antenna signals by the orthogonal matrix, and therefore, the signals output by the antennas generate different phases. For polarization antennas, different phases of the output signals make the performance of the HSDPA fluctuate, and the performance of the HSDPA is improved while the power balance is kept between the antennas.

Figure 5:
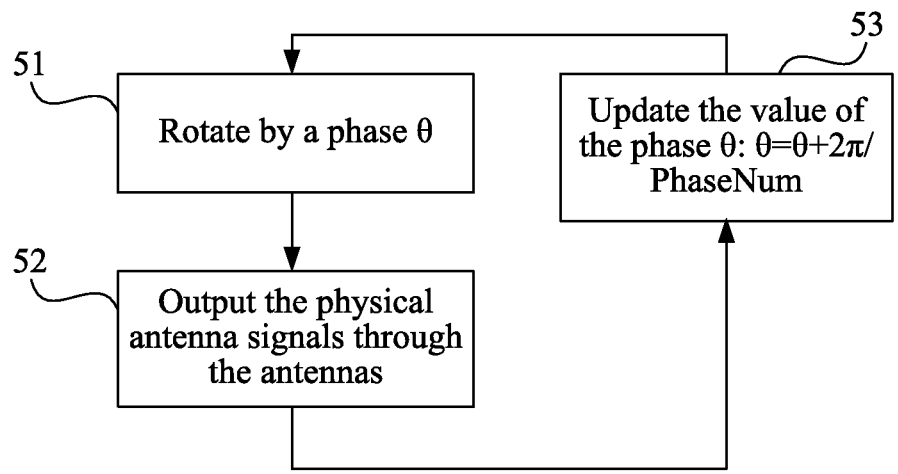
FIG. 5 is a flowchart of a method for balancing power between antennas according to another embodiment of the present invention.

FIG. 5 is a flowchart of a method for balancing power between antennas according to another embodiment of the present invention. In this embodiment, it is assumed that two antennas exist, and only one signal which is obtained by multiplying the virtual antenna signal by the orthogonal matrix is phase rotated. As shown in FIG. 5, the method may include the following steps.

Step 51: Rotate, by a phase θ, the intermediate regulative signal obtained after the virtual antenna signal is multiplied by the VAM matrix.

For example, with respect to the output signals shown in FIG. 4, $$\frac{\sqrt{2}}{2}v1 - \frac{\sqrt{2}}{2}v2$$

among the intermediate regulative signals $$\frac{\sqrt{2}}{2}v1 + \frac{\sqrt{2}}{2}v2 \text{ and } \frac{\sqrt{2}}{2}v1 - \frac{\sqrt{2}}{2}v2,$$

which are obtained after the virtual antenna signals v1 and v2 are multiplied by the VAM matrix of $$\frac{\sqrt{2}}{2}\begin{pmatrix} 1 & 1 \\ 1 & -1 \end{pmatrix},$$

is rotated by the phase θ, to obtain a physical antenna signal s2. That is, $$s2 = \left(\frac{\sqrt{2}}{2}v1 - \frac{\sqrt{2}}{2}v2\right) \times e^{j\theta}.$$

The physical antenna signal $$s1 = \frac{\sqrt{2}}{2}v1 + \frac{\sqrt{2}}{2}v2,$$

namely, the physical antenna signal is equivalent to the intermediate regulative signal. In this way, a phase difference exists between the physical antenna signal s1 and the physical antenna signal s2, and the performance of the HSDPA may be improved.

Note that the phase rotation may be performed for $$\frac{\sqrt{2}}{2}v1 + \frac{\sqrt{2}}{2}v2,$$

or for both $$\frac{\sqrt{2}}{2}v1 + \frac{\sqrt{2}}{2}v2 \text{ and } \frac{\sqrt{2}}{2}v1 - \frac{\sqrt{2}}{2}v2$$

(by different rotary phases), and this embodiment is not limited thereto.

Step 52: Output the physical antenna signals through the antennas.

Still taking FIG. 4 as an example, antenna Ant1 outputs the physical antenna signal s1, and antenna Ant2 outputs the physical antenna signal s2. A phase difference exists between the physical antenna signal s1 and the physical antenna signal s2. Therefore, through a corresponding scheduling algorithm such as Proportional-Fair (PF) scheduling algorithm, the high-performance UEs are scheduled, and the diversity gain of the UE is utilized, which may improve throughput of a cell. Further, the corresponding scheduling algorithm may enhance the performance of the HSDPA.

Step 53: Update the value of the phase θ in a 2π period, and subsequently use the updated θ to rotate the phase of at least one of the intermediate regulative signals.

The mode of updating the phase θ may be: θ=θ+2π/PhaseNum, where PhaseNum is the number of phases rotated in a period, and may be a random natural number. The phase adjustment process is also known as phase periodic rotation.

After the phase θ is adjusted, steps 51 to 53 are performed until the phase difference between the physical antenna signals traverses from 0 to 2π. Under all the rotated phases, the UEs of high CQI may be scheduled all along. That is, the diversity gain of the UE is utilized to improve throughput of the cell and enhance the performance of the HSDPA.

After the update of θ in a 2π period is completed (that is, the number of times for updating θ reaches PhaseNum), the initial value of θ may be a random value in the subsequent update period of θ.

Figure 6:
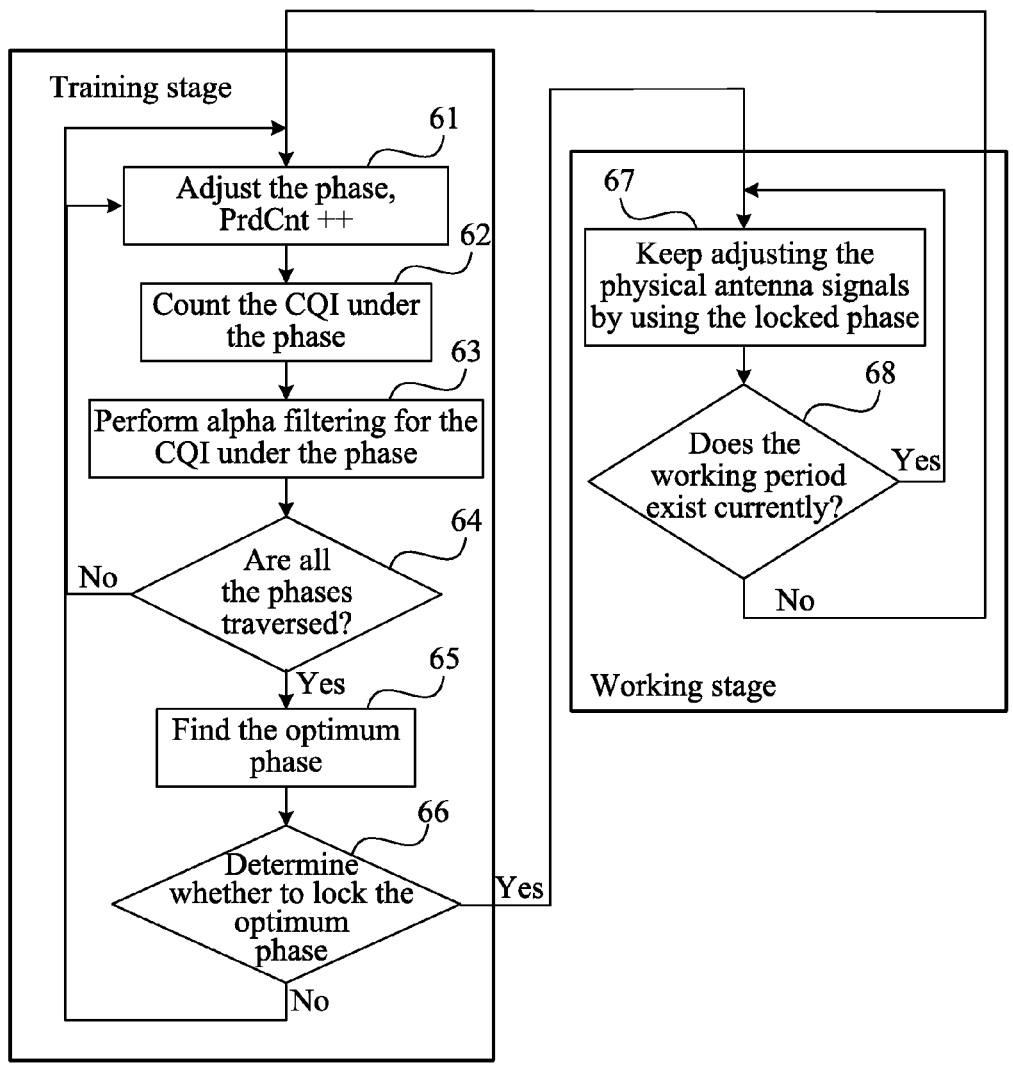
FIG. 6 is a flowchart of a method for balancing power between antennas according to another embodiment of the present invention.

FIG. 6 is a flowchart of a method for balancing power between antennas according to another embodiment of the present invention. As shown in FIG. 6, the method may include a training stage and a working stage. In the training stage, the phase is rotated according to a 2π period, and statistics are made on the receiving quality of the UE. The training stage may include one or more 2π periods until an optimum phase is locked. Once the optimum phase is locked, the training stage is completed, and the working stage begins. Here, a 2π period is called a training period. On the basis of the phase periodic rotation in the embodiment shown in FIG.

5, the training stage includes an additional step of finding the optimum phase and determining a locking state. In the working stage, the optimum phase is set, a set working period is applied, and the training stage begins when the working period expires. The training stage and the working stage may be implemented by periods, and the period may be set according to actual needs. The working stage may also be ended by a base station when the optimum phase does not bring improvement of the performance of the HSDPA, and then the training stage begins.

For ease of description, parameters and variables involved in the training stage and the working stage are described first. Specifically, the algorithm parameters in the training stage may be shown in Table 1.

TABLE 1

| Parameter name | Unit | Remarks |
| --- | --- | --- |
| MAX_PHASE_NUM | | Maximum number of phases rotated in a period |
| ProPrd | ms | Processing period for adjusting the phase once |
| TrainPrd | ProPrd | Training period, whose maximum value is MAX_PHASE_NUM, namely, TrainPrd<=MAX_PHASE_NUM. To set the number of phases flexibly, a maximum number of rotary phases is set. Specifically, the number (TrainPrd) of actual rotary phases is configured through parameters, and the TrainPrd is less than or equal to MAX_PHASE_NUM. |
| WorkPrd | | Working period, whose value is 0 if only a training stage exists |
| Alphalock | | CQI filtering coefficient for locking state determination Defined in the same way as alpha filtering, alpha = $2^{-k/2}$ A small value of the filtering coefficient leads to strong smoothing effect, but has poor tracking capability; and a great value of the filtering coefficient leads to weak smoothing effect, but has strong tracking capability. |
| Alphaunlock | | CQI filtering coefficient for non-locking state determination Defined in the same way as alphalock |

The algorithm variables in the training stage may be shown in Table 2.

TABLE 2

| Variable name | Initial value | Remarks |
| --- | --- | --- |
| PrdCnt | 0 | Processing period counter When change occurs at the border of ProPrd, if the value of PrdCnt changes from 0 to TrainPrd, it indicates completion of phase rotation in a 2π period. |
| CqiSum[0~MAX_PHASE_NUM-1] | 0 | CQI sum Under each set phase, count the CqiSum[i] respectively, i∈ [0, MAX_PHASE_NUM-1] |
| CqiCnt[0~MAX_PHASE_NUM-1] | 0 | Number of reported CQIs Under each set phase, count the CqiCnt[i] respectively, i∈ [0, MAX_PHASE_NUM-1] |

The algorithm variables in the working stage may be shown in Table 3.

TABLE 3

| Variable name | Initial value | Remarks |
| --- | --- | --- |
| WorkLockFlg | 0 | Working state locking flag |
| OptimumPhaseIdx | 0 | Optimum phase index |
| StsCqiLock[0~MAX_PHASE_NUM-1] | 0 | CQI statistic quantity: CQI statistic value for locking determination |
| StsCqiUnlock[0~MAX_PHASE_NUM-1] | 0 | CQI statistic quantity: CQI statistic value for non-locking determination |
| LockThreshold | | Locking state determination threshold |
| UnlockThreshold | | Unlocking state determination threshold |

The training stage may include the following steps.

Step 61: Adjust the phase.

The phase is adjusted at an interval of a ProPrd period, and the adjusted phase is used to perform phase rotation for the signal obtained by multiplying a virtual antenna signal by an orthogonal matrix. In a training period, PrdCnt changes at the border of ProPrd: PrdCnt++, namely, the value of PrdCnt plus 1. That is, different values of PrdCnt lead to different phases. Therefore, PrdCnt=(PrdCnt+1)mod TrainPrd, with a view to avoiding PrdCnt>TrainPrd.

At the border of ProPrd, the value of $e^{j\theta}$ is set: θ=(2π/TrainPrd)×PrdCnt. 2π/TrainPrd refers to equally dividing a 2π into TrainPrd phases. When TrainPrd is equal to MAX_PHASE_NUM, 2π/TrainPrd=2π/PhaseNum. The current θ may be calculated through θ=θ(previous)+2π/PhaseNum. If 2π/TrainPrd=2π/PhaseNum=π/3, in a 2π, PrdCnt has six values: 1, 2, 3, 4, 5, and 6, which correspond to phases π/3, 2π/3, π, 4π/3, 5π/3, and 2π respectively. If current phase is the fourth phase, it may be calculated that (2π/TrainPrd)×PrdCnt=(π/3)×4=4π/3 or θ=θ(previous)+2π/PhaseNum=π+π/3=4π/3.

After the phase adjustment of the set $e^{j\theta}$, a corresponding phase difference exists between the signals output by the antennas.

Note that the foregoing phase setting process is conceptually the same as the embodiment shown in FIG. 2, and the update of rotary phase here occurs at an interval of a ProPrd period.

Step 62: Make statistics on the performance of different phases.

Under different phases, performance statistics may be made according to the CQI reported by the UE. The CQI may be the CQI reported by the UE according to the signals output by the antennas of the base station. That is, after receiving the signals sent by the base station, the UE may obtain the CQI according to the received signals.

The performance statistics may be made as follows.

After the CQI reported by the UE is received, if the UE is in a data transmission state, a flag is set, so as to count the CQI reported by the UE in the data transmission state. As the UE not in the data transmission state may also report the CQI, but this CQI does not need to be counted, the flag tells which CQI reported by the UE needs to be counted. For example, the flag of the CQI reported by the UE in the data transmission state is set to 1, and the flag of the CQI reported by the UE in the non-data transmission state is set to 0, so that it is practicable to count only the CQIs whose flag is 1. The CQIs may be counted in the following manner:

CqiSum[PrdCnt]+=report CQI;

CqiCnt[PrdCnt]++.

For example, in step 61, if θ=π/3, the CQIs may be accumulated until the performance of θ=π/3 in each previous TrainPrd is accomplished. That is, the CQIs reported by the UE according to signals output after θ=π/3 phase adjustment each time are accumulated. If PrdCnt is 1 when θ=π/3, the CQIs received when PrdCnt is 1 in each 2π period are accumulated, and the number of CQIs received in the case of θ=π/3 by the current time is counted.

Step 63: Filter the performance of different phases.

The CQI mean value under the same phase, namely, CqiMean[i], may be calculated.

For example, i=0:TrainPrd-1; CqiMean[i]=CqiSum[i]/CqiCnt[i].

Here, i=0 means that the index is 0, and i=TrainPrd-1 means that the index is TrainPrd-1. If the current phase is π/3, it is necessary to accumulate CQIs reported by the UE under π/3 in the first TrainPrd, CQIs reported by the UE under π/3 in the second TrainPrd, . . . , and CQIs reported by the UE under π/3 in the current TrainPrd, and divide the accumulated value by the number of CQIs to generate a CQI mean value of the phase of π/3.

Alpha filtering is performed for a CQI statistic value for locking determination obtained with respect to the same phase in different training periods:

StsCqiLock[PrdCnt]=StsCqiLock[PrdCnt]×(1-alphalock)+CqiMean[i]×alphalock.

Still π/3 is taken as an example, and CqiMean[i] is a CQI mean value of π/3. The CQI statistic value for locking determination under π/3 of the current TrainPrd is equal to the CQI statistic value for locking determination under π/3 of the previous TrainPrd and the alpha filtering value of the CQI mean value of the phase of π/3.

Alpha filtering is performed for the CQI statistic value for non-locking determination in different training periods: StsCqiUnlock[PrdCnt]=StsCqiUnlock[PrdCnt]×(1-alphaunlock)+CqiMeank[i]×alphaunlock.

Still π/3 is taken as an example, and CqiMean[i] is a CQI mean value of π/3. The CQI statistic value for non-locking determination under π/3 of the current TrainPrd is equal to the CQI statistic value for non-locking determination under π/3 of the previous TrainPrd and the alpha filtering value of the CQI mean value of the phase of π/3.

The foregoing example uses an alpha filtering mode to filter the CQI statistic value. Understandably, other filtering modes may also be applicable, and the filtering mode is not limited herein.

Step 64: Judge whether all the phases are traversed.

The judging whether all the phases are traversed may be implemented by judging whether a training period is completed. If all the phases are traversed, the procedure proceeds to step 65; and if not all the phases are traversed, the procedure returns to step 61, in which the next phase is used to adjust the phase difference between the output signals.

Step 65: Search for the optimum phase.

Find a maximum value in StsCqiLock[0, . . . , TrainPrd-1]. The index of the phase corresponding to the maximum value (namely, the optimum phase) is assumed to be x, namely, OptimumPhaseIdx=x.

Step 66: Determine the locking state of the phase.

The locking state of the phase may be determined in the following way. According to the CQI statistic value for locking determination and the CQI statistic value for non-locking determination, which are calculated in step 63, the following four mean values are obtained:

CQI mean value for locking determination under all the phases: TempMean1=mean(StsCqiLock[0, . . . , TrainPrd-1]), namely, the first mean value above;

CQI mean value for locking determination under the optimum phase and phases near the optimum phase: TempMean2=mean(StsCqiLock[x-TrainPrd/4, . . . , . . . , TrainPrd/4]), namely, the second mean value above;

CQI mean value for non-locking determination under all the phases: TempMean3=mean(StsCqiUnlock[0, . . . , TrainPrd-1]), namely, the third mean value above; and CQI mean value for non-locking determination under the optimum phase and phases near the optimum phase: TempMean4=mean(StsCqiUnlock[x-TrainPrd/4, . . . , . . . , x+TrainPrd/4]), namely, the fourth mean value above.

If the TempMean4-TempMean3<UnlockThreshold, the optimum phase found in step 65 is in the non-locking state, WorkLockFlg=0, and the procedure returns to step 61; otherwise, if (TempMean2-TempMean1>LockThreshold)&&(TempMean4-TempMean3>LockThreshold), the optimum phase found in step 65 is in the locking state, WorkLockFlg=1, the procedure proceeds to step 67, and the working stage begins.

Step 67: When entering the working stage, start the counter to count, and keep adjusting the physical antenna signals by using the locked phase, namely, rotate the phase.

Step 68: Compare the count value of the counter with the value of the set working period to judge whether the working period exists currently; if the working period exists currently (for example, if the count value is smaller than the value of the working period), go on performing step 67; and if the working period does not exist currently, end the working stage, return to step 61, and enter the training stage.

The performance statistics and the determining of the optimum phase in the foregoing training stage are not specific to each UE, but are specific to each cell. Understandably, in practice, the performance statistics and the determining of the optimum phase may also be specific to each UE. That is, the performance statistics are made to different UEs in the cell under different phases, and the optimum phase of different UEs is determined according to the result of the performance statistics. The mode of UE-specific performance statistics is basically the same as the mode of cell-specific performance statistics, except that the statistics are made to each UE in the cell. The details are described in the following.

First, the parameters involved in the UE-specific performance statistics are described in Table 4.

TABLE 4

| Variable name | Initial value | Remarks |
|---|---|---|
| CQI sum CqiSum[m][0~MAX_PHASE_NUM-1] | 0 | m represents different UEs; under each set phase, count the CQI sum, that is, CqiSum[m][i], respectively, where i∈ [0, MAX_PHASE_NUM-1] |
| Number of reported CQIs CqiCnt[m][0~MAX_PHASE_NUM-1] | 0 | m represents different UEs; under each set phase, count the number of reported CQIs, that is, CqiCnt[m][i], respectively, where i∈ [0, MAX_PHASE_NUM-1] |
| OptimumPhaseIdx[m]OptimumPhaseIdx[m] | 0 | m represents different UEs |
| CQI statistic quantity: StsCqi[m][0~MAX_PHASE_NUM-1] | 0 | CQI statistic value of m |

The CQI statistics are made in the following manner:

CqiSum[m][PrdCnt]+=reported CQI;

CqiCnt[m][PrdCnt]++.

Performance filtering under different phases is performed for each UE in the following manner.

For each UE in the cell, process i=0:TrainPrd-1 cyclically;

CqiMean[m][i]=CqiSum[m][i]/CqiCnt[m][i].

Perform alpha filtering for the CQI statistic value in different training periods:

StsCqi[m][PrdCnt]=StsCqi[m][PrdCnt]*(1-alphalock)+CqiMean[m][i]*alphalock.

The optimum phase may be found for each UE in the following manner. For each UE in the cell, find the maximum value MaxCqi[m] in StsCqi[m][0, . . . , TrainPrd-1]. Assuming that its index is x[m], the phase corresponding to the maximum value is the optimum phase.

After the optimum phase is determined for each UE, locking determination is not necessary, and the working stage begins directly. In the working stage, the optimum phase of the UE may be set in one of the following manners.

1. Schedule the UE according to the current scheduling algorithm. When scheduling a specific UE such as the first UE, set the optimum phase of the first UE according to the found optimum phase of the first UE;

2. Alternatively, sort the determined optimum phases of the UEs in certain order, for example, in the order from a small value to greater values of the optimum phase; schedule the UEs in the order from a small value to greater values of the optimum phase; and when scheduling the first UE, set the optimum phase of the first UE by using the determined optimum phase of the first UE. For example, if the determined optimum phase of UE A is alpha, and the determined optimum phase of UE B is beta, set the optimum phase of UE A as alpha when scheduling UE A, and set the optimum phase of UE B as beta when scheduling UE B. Understandably, the UEs may be scheduled in the order from a great value to smaller values of the optimum phase. The process of scheduling all the UEs in the order of the magnitude of the optimum phase is equivalent to sweeping the phases within a $2\pi$ range.

In the foregoing manner, the UE-specific optimum phase is determined, and the optimum phase may be set for each UE separately; therefore, the optimum phase is UE-specific, the performance of each UE is optimized, and the overall performance is optimized.

Figure 7:
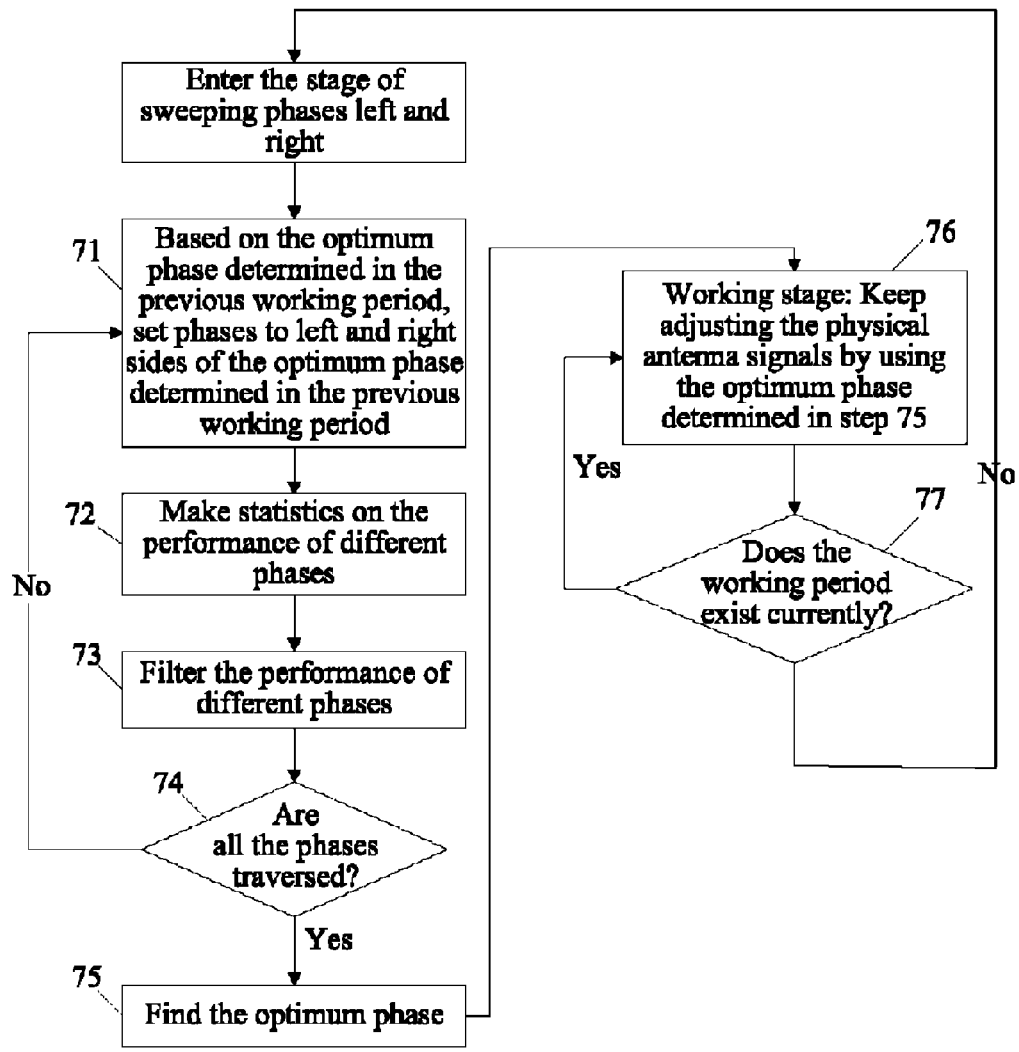
FIG. 7 is a schematic diagram of sweeping phases left and right in a method for balancing power between antennas according to another embodiment of the present invention.

Further, on the basis of existing optimum phases, if the phases need to be swept again, it is appropriate to sweep the phases to left and right sides of the optimum phase to find the optimum phase instead of traversing all the phases in $[0, 2\pi]$. As shown in FIG. 7, in another embodiment of the present invention, the phases to left and right sides of the optimum phase are swept to find the optimum phase in a method for balancing power between antennas, and the sweeping process includes the following steps.

Step 71: Based on the optimum phase determined in the previous working period, set phases to left and right sides of the optimum phase determined in the previous working period.

The mode of setting the phases to left and right sides of the optimum phase determined in the previous working period may be as follows.

Assuming that the optimum phase determined in the previous working period is OptimumPhase, the range of phases to be set may be [OptimumPhase-d*$\theta_1$, OptimumPhase+d*$\theta_1$], where 2d+1 is the number of times for updating the phases in this phase sweeping process, $\theta_1$ is an amplitude of each phase adjustment, and the values of d and $\theta_1$ are set at random.

The phase may be adjusted in each adjustment period ProPrd' of sweeping the phases left and right. Understandably, the period of sweeping the phases to left and right sides of the optimum phase and finding the optimum phase is (2d+1)*ProPrd'. This period is called "period of sweeping the phases left and right". In the period of sweeping the phases left and right, PrdCnt changes at the border of ProPrd': PrdCnt++, namely, the value of PrdCnt plus 1. In other words, different values of PrdCnt correspond to different phases. The value range of PrdCnt is [-d, d]. For example, assuming that the start phase to be swept is OptimumPhase-d*$\theta_1$, the next adjusted phase is OptimumPhase+(-d+1)*$\theta_1$. The adjustment period ProPrd' of sweeping the phases left and right may be set according to actual needs.

Step 72: Make statistics on the performance of different phases.

In step 71 above, 2d+1 phases exist. Under the 2d+1 phases, the performance statistics are made according to the CQI reported by the UE to obtain the CQI sum under the same phase in different stages of sweeping the phases left and right. For the detailed statistic mode, see the description in step 62.

Step 73: Filter the performance of different phases.

The mode of filtering the performance of different phases is similar to the mode of filtering the performance of different phases in step 63, but the difference lies in that no locking determination is required in step 73. For example, the CQI mean value under the same phase, namely, CqiMean'[i], may be calculated.

For example, i=-d:d; CqiMean'[i]=CqiSum'[i]/CqiCnt'[i]. In this relationship, CqiMean'[i] is the CQI mean value under the same phase counted in the phase setting mode in step 71; CqiSum'[i] is the CQI sum counted under each phase; and CqiCnt'[i] is the number of reported CQIs counted under each phase.

Through the following filtering operation, the result of the alpha filtering for the CQI statistic value is obtained:

StsCqi'[PrdCnt]=StsCqi'[PrdCnt]×(1-alphalock)+CqiMean'[i]×alphalock.

StsCqi'[PrdCnt] is the CQI statistic value in the period of sweeping the phases left and right.

Step 74: Judge whether all the phases are traversed.

The judging whether all the phases are traversed may be implemented by judging whether a period of sweeping the phases left and right is completed. If all the phases are traversed, the procedure proceeds to step 75; and if not all the phases are traversed, the procedure returns to step 71, in which the next phase is used to adjust the phase difference between the output signals.

Step 75: Search for the optimum phase.

Find the maximum value in StsCqi[-d, d]. The phase corresponding to the maximum value is the optimum phase. The index of the phase corresponding to the maximum value (namely, the optimum phase) is assumed to be y, namely, OptimumPhaseIdy=y.

If only one maximum value exists in StsCqq[-d, d], the phase corresponding to the maximum value is used as the optimum phase; while if two or more identical values exist as the maximum value in the StsCqi[-d, d], it is deemed that no optimum phase is found, and the optimum phase in the previous working period may be used as the optimum phase.

After step 75, step 76 may be performed to enter the working stage.

Step 76: When entering the working state, start the counter to count, and keep adjusting the physical antenna signals by using the optimum phase determined in step 75.

Step 77: Compare the count value of the counter with the value of the set working period to judge whether the working period exists currently; if the working period exists currently (for example, if the count value is smaller than the value of the working period), go on performing step 76; and if the working period does not exist currently, end the working stage, enter the stage of sweeping the phases left and right, and proceed to step 71.

Understandably, the process of determining the optimum phase in FIG. 7 may be called a stage of sweeping the phases left and right.

In the foregoing embodiment, the optimum phase is determined by sweeping the phases left and right, which enables fast tracking of a new optimum phase at low costs.

Figure 8:
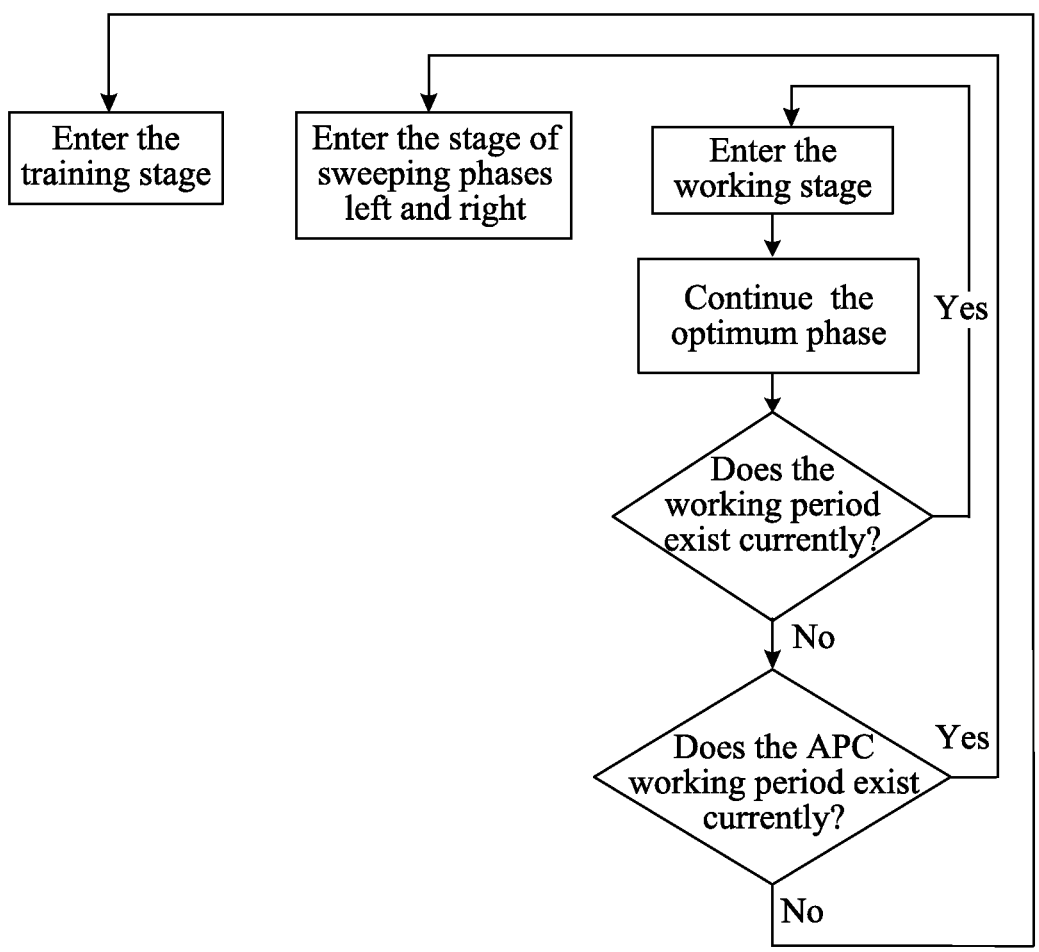
FIG. 8 is a flowchart of a method for balancing power between antennas according to another embodiment of the present invention.

Further, based on the embodiments shown in FIG. 6 and FIG. 7, an auto phase control (APC) working period may be added to judge whether a training stage or a stage of sweeping the phases left and right begins. That is, after it is determined that the working period does not exist currently, that is, the working period has expired (the expiry of the working period means that the working period ends), it is further judged whether an APC working period has expired. If the APC working period has not expired (the expiry of the APC working period means that the APC working period ends), the stage of sweeping the phases left and right in FIG. 7 begins; while if the APC working period has expired, the training stage described in steps 61 to 66 begins. For the detailed procedure, see FIG. 8. FIG. 8 is a schematic diagram of the process of controlling the APC working period, which does not illustrate the complete process of the training stage or the stage of sweeping the phases left and right. For more details, see the embodiments in FIG. 6 and FIG. 7.

An APC working period includes at least one training period, at least two working periods and at least one period of sweeping the phases left and right. For example, an APC working period=a training period+(N+1)*working period+N*period of sweeping the phases left and right, where N is a natural number set at random.

Understandably, a counter or a timer may be used to judge whether an APC working period exists currently.

Figure 9:
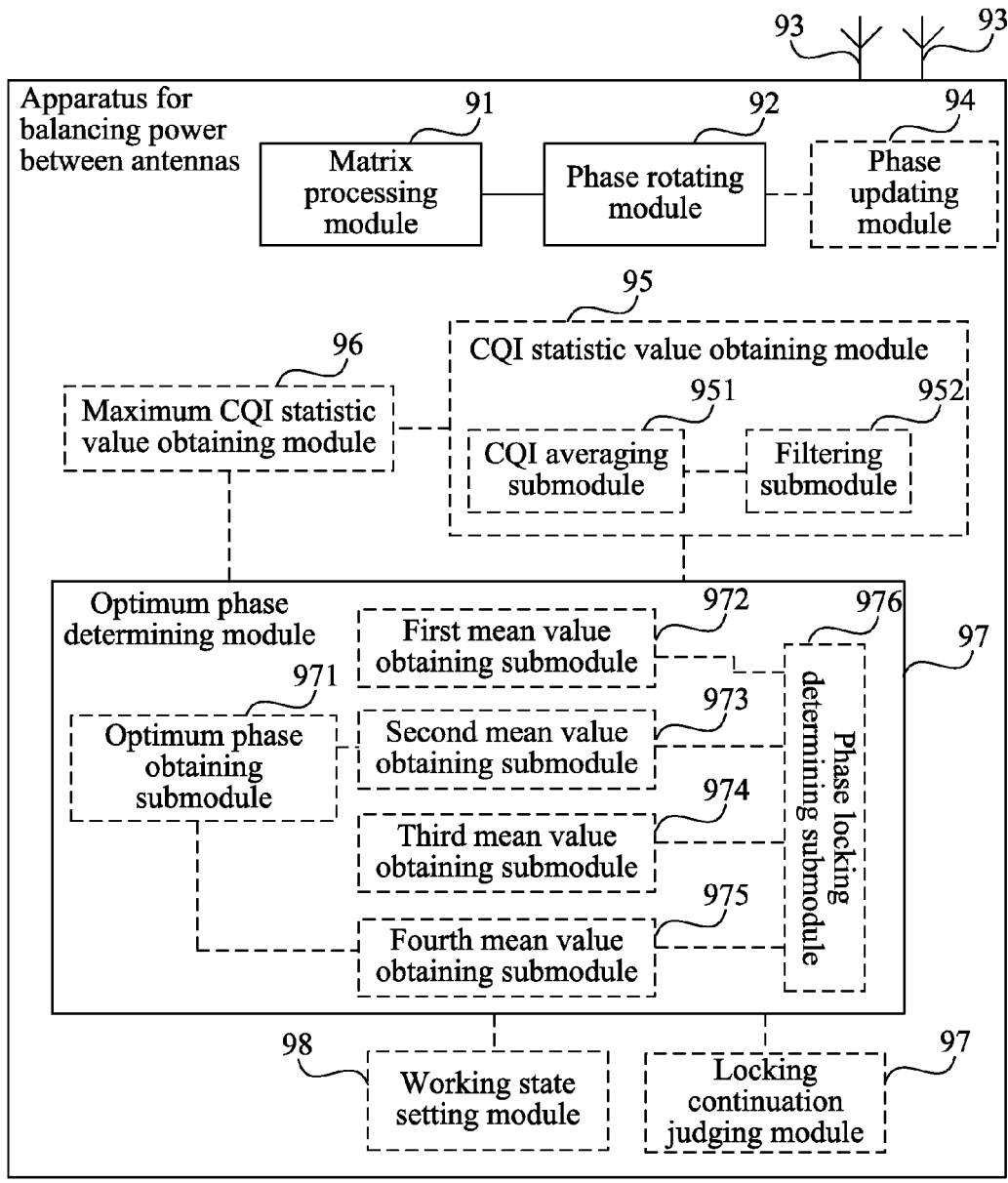
FIG. 9 is a schematic structure diagram of an apparatus for balancing power between antennas according to an embodiment of the present invention.

FIG. 9 is a schematic structure diagram of an apparatus for balancing power between antennas according to an embodiment of the present invention. As shown in FIG. 9, the apparatus includes a matrix processing module 91, a phase rotating module 92, and antennas 93. The matrix processing module 91 is configured to multiply n virtual antenna signals by an orthogonal matrix to obtain n intermediate regulative signals, where n is an integer that fulfills n≥2. The phase rotating module 92 is configured to use a corresponding rotary phase to rotate phases of m of the n intermediate regulative signals, where m is an integer that fulfills 1≤m≤n, so that a phase difference exists between at least two of n physical antenna signals output by the antennas. When m<n, the physical antenna signals include intermediate regulative signals whose phase is not rotated. The antennas 93 are configured to output the n physical antenna signals. The phase rotating module 92 may be specifically configured to multiply the m intermediate regulative signals by $e^{j\theta_p}$ to rotate the phase, where $\theta_p$ is the rotary phase corresponding to the m intermediate regulative signals, and p is 1 to m.

The apparatus for balancing power between antennas in this embodiment may further include: a phase updating module 94, configured to update the value of $\theta_p$ within a 2π period when a preset period expires or preset conditions are fulfilled.

The update of the value of $\theta_p$ includes: $\theta_p$=phase of previous phase rotation+2π/PhaseNum, where PhaseNum is the number of times for updating the value of $\theta_p$ in a preset 2π period. In this case, the phase rotating module 92 is specifically configured to use the updated $\theta_p$ to rotate the phases of the m intermediate regulative signals subsequently.

The phase updating module 94 is further configured to keep updating the value of $\theta_p$ when the number of times for updating the value of $\theta_p$ within a 2π period is less than PhaseNum.

The apparatus for balancing power between antennas in this embodiment may further include: a first CQI statistic value obtaining module 95, a first maximum CQI statistic value obtaining module 96, and a first optimum phase determining module 97.

The first CQI statistic value obtaining module 95 is configured to obtain the CQI statistic value for locking determination reported by the UE under each rotary phase. The first maximum CQI statistic value obtaining module 96 is configured to find the maximum CQI statistic value among the CQI statistic values obtained for locking determination. The first optimum phase determining module 97 is configured to determine whether to lock the phase corresponding to the maximum CQI statistic value according to the CQI statistic value for locking determination.

The first CQI statistic value obtaining module 95 may include a first CQI averaging submodule 951 and a first filtering submodule 952.

The first CQI averaging submodule 951 is configured to average CQIs reported under the same rotary phase in at least one 2π period, and obtain a CQI mean value under the same rotary phase. The first filtering submodule 952 is configured to filter the CQI mean value under the same rotary phase to obtain the CQI statistic value for locking determination under each rotary phase.

The first optimum phase determining module 97 includes: an optimum phase obtaining submodule 971, a first mean value obtaining submodule 972, a second mean value obtaining submodule 973, a third mean value obtaining submodule 974, a fourth mean value obtaining submodule 975, and a phase locking determining submodule 976.

The optimum phase obtaining submodule 971 is configured to find the optimum phase according to the maximum CQI statistic value, where the optimum value is the phase corresponding to the maximum CQI statistic value. The first mean value obtaining submodule 972 is configured to average the CQI statistic value for locking determination under each rotary phase in the current 2π period to obtain a first mean value. The second mean value obtaining submodule 973 is configured to average the CQI statistic values for locking determination under phases whose index falls within [index of the optimum phase minus the number of times for updating the value of $\theta_p$ in a 2π period/4, index of the optimum phase plus the number of times for updating the value of $\theta_p$ in a 2π period/4] to obtain a second mean value. The third mean value obtaining submodule 974 is configured to average CQI statistic values for non-locking determination which are obtained according to all the phases for phase rotation to obtain a third mean value. The fourth mean value obtaining submodule 975 is configured to average the CQI statistic values for non-locking determination under phases whose index falls within [index of the optimum phase minus the number of times for updating the value of $\theta_p$ in a 2π period/4, index of the optimum phase plus the number of times for updating the value of $\theta_p$ in a 2π period/4] to obtain a fourth mean value. The phase locking determining submodule 976 is configured to determine whether to lock the optimum phase according to the first mean value, the second mean value, the third mean value, and the fourth mean value. For example, the phase locking determining submodule 976 may be specifically configured to lock the optimum phase if a difference between the fourth mean value and the third mean value is greater than a non-locking state determination threshold, a difference between the second mean value and the first mean value is greater than a locking state determination threshold, and a difference between the fourth mean value and the third mean value is greater than the locking state determination threshold.

The phase rotating module 92 may be specifically configured to rotate the phases of the m intermediate regulative signals by using the locked optimum phase after the optimum phase is locked.

The apparatus for balancing power between antennas in this embodiment may further include: a working state setting module 98, configured to set the value of a working state locking flag according to the state of locking the optimum phase. For example, the working state setting module 98 sets the value of the working state locking flag to 0 when the optimum phase is not locked, and sets the value of the working state locking flag to 1 when the optimum phase is locked, where the locking flag is an indication of locking the optimum phase. For meanings of the value of the working state locking flag, see the description in the method embodiment above.

The apparatus for balancing power between antennas in this embodiment may further include: a locking continuation judging module 99, configured to judge whether to continue phase rotation for the m intermediate regulative signals by using the optimum phase according to the set working period. For the detailed judgment method, see the description in the method embodiment above.

The apparatus for balancing power between antennas in this embodiment may further include a first scheduling module, configured to schedule UEs through a PF scheduling algorithm so as to utilize the diversity gain of the UE and improve throughput of a cell. Further, the corresponding scheduling algorithm may enhance the performance of the HSDPA.

For the detailed implementation and interaction process of the apparatus for balancing power between antennas in this embodiment, see the corresponding method embodiment above, and the description will not be made herein again.

In this embodiment, the apparatus for balancing power between antennas rotates the phases for the signals obtained as a result of multiplying the virtual antenna signals by the VAM matrix, and therefore, the signals output by the antennas generate different phases. For polarization antennas, different phases of the output signals make the performance of the HSDPA fluctuate, and the performance of the HSDPA is improved while the power balance is kept between the antennas.

In addition to the search for the cell-specific optimum phase, the UE-specific optimum phase may be searched as well. Another embodiment of the present invention provides an apparatus for balancing power between antennas, which may include a matrix processing module, a phase rotating module, and antennas.

The matrix processing module is configured to multiply n virtual antenna signals by an orthogonal matrix to obtain n intermediate regulative signals, where n is an integer that fulfills n≥2. The phase rotating module is configured to use a corresponding rotary phase to rotate phases of m of the n intermediate regulative signals, where m is an integer that fulfills 1≤m≤n, so that a phase difference exists between at least two of n physical antenna signals output by the antennas. When m<n, the physical antenna signals include intermediate regulative signals whose phase is not rotated. The antennas are configured to output the n physical antenna signals. The phase rotating module may be specifically configured to multiply the m intermediate regulative signals by $e^{j\theta_p}$ to rotate the phase, where $\theta_p$ is the rotary phase corresponding to the m intermediate regulative signals, and p is 1 to m.

The apparatus may further include a phase updating module, configured to update the value of $\theta_p$ within a $2\pi$ period when a preset period expires or preset conditions are fulfilled. The update of the value of $\theta_p$ includes: $\theta_p$=phase of previous phase rotation+$2\pi$/PhaseNum, where PhaseNum is the number of times for updating the value of $\theta_p$ in a preset $2\pi$ period. In this case, the phase rotating module is specifically configured to use the updated $\theta_p$ to rotate the phases of the m intermediate regulative signals subsequently.

The apparatus may further include a second CQI statistic value obtaining module, a second maximum CQI statistic value obtaining module, and a second optimum phase determining module.

The second CQI statistic value obtaining module is configured to obtain the CQI statistic value specific to each UE under each rotary phase. The second maximum CQI statistic value obtaining module is configured to find the maximum CQI statistic value specific to each UE among the obtained UE-specific CQI statistic values. The second optimum phase determining module is configured to use the phase corresponding to the maximum CQI statistic value specific to each UE as the optimum phase of the UE.

The second CQI statistic value obtaining module may include a second CQI averaging submodule and a second filtering submodule.

The second CQI averaging submodule is configured to average CQIs reported by each UE under the same rotary phase in at least one $2\pi$ period, and obtain a CQI mean value of each UE under the same rotary phase. The second filtering submodule is configured to filter the CQI mean value of each UE under the same rotary phase to obtain the CQI statistic value of each UE under each rotary phase.

Understandably, in this embodiment, the working stage may begin after the second optimum phase determining module determines the optimum phase of each UE. Further, the apparatus in this embodiment may include a second scheduling module. The second scheduling module is configured to schedule the UE according to the current scheduling algorithm, and when scheduling the first UE, set the optimum phase of the first UE according to the optimum phase of the first UE which is found by the second optimum phase determining module. Alternatively, the second scheduling module is configured to sort the determined optimum phases of the UEs in certain order, for example, in the order from a small value to greater values of the optimum phase; schedule the UEs in the order from a small value to greater values of the optimum phase; and when scheduling the first UE, set the optimum phase of the first UE by using the determined optimum phase of the first UE. For example, if the determined optimum phase of UE A is alpha, and the determined optimum phase of UE B is beta, the second scheduling module sets the optimum phase of UE A as alpha when scheduling UE A, and sets the optimum phase of UE B as beta when scheduling UE B. Understandably, the UEs may also be scheduled in the order from a great value to smaller values of the optimum phase. The process of scheduling all the UEs in the order of the magnitude of the optimum phase is equivalent to sweeping the phases within a $2\pi$ range.

In the foregoing manner, the UE-specific optimum phase is determined, and the optimum phase may be set for each UE separately, and therefore, the optimum phase is UE-specific, the performance of each UE is optimized, and the overall performance is optimized.

Further, on the basis of existing optimum phases, if the phases need to be swept again, it is appropriate to merely sweep the phases left and right. Based on the apparatus shown in FIG. 9, an embodiment of the present invention provides an apparatus for balancing power between antennas. The apparatus may include a second phase updating module.

The second phase updating module is configured to set phases to left and right sides of the optimum phase determined in the previous working period by centering on the optimum phase determined in the previous working period. The setting of the phases includes: updating the values of the phases in [OptimumPhase-d*$\theta_1$, OptimumPhase+d*$\theta_1$] respectively in each adjustment period of sweeping the phases left and right, where OptimumPhase is the optimum phase determined in the previous working period, 2d+1 is the number of times for updating the phases in the phase sweeping process, and $\theta_1$ is an amplitude of each phase update.

In the foregoing description, d and $\theta_1$ may be set to random values. For example, assuming that the start phase to be swept is OptimumPhase-d*$\theta$, the next adjusted phase is OptimumPhase+(−d+1)*$\theta$.

The phase rotating module may be further configured to perform phase rotation according to the phase set by the second phase updating module.

The apparatus may further include a summing module, configured to count CQIs reported by the UE under 2d+1 phases in the stages of sweeping the phases left and right to obtain a CQI sum under the same phase in different stages of sweeping the phases left and right.

For example, CqiSum[PrdCnt']+=reported CQI; CqiCnt[PrdCnt']++.

The apparatus may further include a filtering module, configured to obtain a CQI mean value under the same phase according to the CQI sum under the same phase obtained by the summing module; and obtain a filtered CQI statistic value according to the mean value. The method of obtaining the filtered CQI statistic value may be:

$$StsCqi'[PrdCnt]=StsCqi'[PrdCnt]\times(1-alphalock)+CqiMean'[i]\times alphalock,$$

where CqiMean'[i] is the CQI mean value under the same phase, and StsCqi'[PrdCnt] is the CQI statistic value.

The apparatus may further include a traverse judging module, configured to judge whether all the phases are traversed, namely, judge whether the number of times for updating the phases reaches 2d+1. Before the number of times for updating the phases reaches 2d+1, the second phase updating module goes on setting the phases, and the phase rotating module uses the next phase to adjust the phase difference between the output signals.

The apparatus further includes an optimum phase searching module, configured to determine a maximum value among the filtered CQI statistic values under all the phases, and determine the phase corresponding to the maximum value as the optimum phase.

If only one maximum value exists in StsCqi[−d, d], the optimum phase searching module uses the phase corresponding to the maximum value as the optimum phase; while if two or more identical values exist as the maximum value in the StsCqi[−d, d], it is deemed that no optimum phase is found, and the optimum phase searching module uses the optimum phase in the previous working period as the optimum phase.

The locking continuation judging module in the apparatus of this embodiment may be further configured to start a counter after the optimum phase searching module determines the optimum phase; keep adjusting the physical antenna signals by using the optimum phase determined by the optimum phase searching module before the working period expires; and when the working period expires, start the second phase updating module to enter the stage of sweeping the phases left and right again.

The apparatus in this embodiment determines the optimum phase by sweeping the phases left and right, which enables fast tracking of a new optimum phase at low costs.

The apparatus may further include an APC working period judging module, configured to judge whether the APC working period expires when the working period judging module determines expiry of the working period; if the APC working period has not expired, start the second phase updating module to enter the stage of sweeping the phases left and right, or, if the APC working period has expired, start the phase updating module 94 to enter the training stage. An APC working period includes at least one training period, at least two working periods and at least one period of sweeping the phases left and right. For example, an APC working period=a training period+(N+1)*working period+N*period of sweeping the phases left and right, where N is a natural number set at random. Understandably, a counter or a timer may be used to judge whether an APC working period exists currently.

For the detailed implementation and interaction process of the modules or submodules of the apparatus for balancing power between antennas, see the corresponding method embodiment above.

Figure 10:
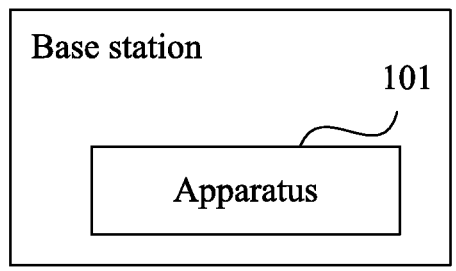
FIG. 10 is a schematic structure diagram of a base station according to an embodiment of the present invention.

FIG. 10 is a schematic structure diagram of a base station according to an embodiment of the present invention. As shown in FIG. 10, the base station includes an apparatus 101, configured to enhance the performance of the HSDPA while keeping power balance between antennas. The apparatus 101 may be an apparatus for balancing power between antennas, which is provided in any of the apparatus embodiments above.

In this embodiment, through the apparatus for balancing power between antennas, the base station rotates the phases for the signals obtained as a result of multiplying the virtual antenna signals by the VAM matrix, and therefore, the signals output by the antennas generate different phases. For polarization antennas, different phases of the output signals make the performance of the HSDPA fluctuate, and the performance of the HSDPA is improved while the power balance is kept between the antennas.

Persons of ordinary skill in the art should understand that all or a part of the steps of the method according to the embodiments of the present invention may be implemented by a program instructing relevant hardware. The program may be stored in a computer readable storage medium. When the program is run, the steps of the method specified in the embodiments of the present invention are performed. The storage medium may be any medium capable of storing program codes, such as a Read-Only Memory (ROM), a Random Access Memory (RAM), a magnetic disk, or a CD-ROM.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for balancing power between antennas, the method comprising:

multiplying n virtual antenna signals by an orthogonal matrix to obtain n intermediate regulative signals, wherein n is an integer that fulfills n≥2; and using a corresponding rotary phase to rotate phases of m of the n intermediate regulative signals, wherein m is an integer that fulfills 1≤m≤n, so that a phase difference exists between at least two of n physical antenna signals output by antennas;

wherein using the corresponding rotary phase to rotate the phases of the m of the n intermediate regulative signals comprises multiplying the m intermediate regulative signals by $e^{j\theta_p}$, wherein $\theta_p$ is a rotary phase corresponding to the m intermediate regulative signals and p is a sequence number of the intermediate regulative signal, where p∈[1, m].

2. The method according to claim 1, further comprising outputting the n physical antenna signals through the antennas.

3. The method according to claim 2, wherein after outputting the n physical antenna signals through the antennas, the method further comprises:

obtaining a channel quality indication (CQI) statistic value for locking determination under each rotary phase;

finding a maximum CQI statistic value among obtained CQI statistic values for locking determination; and determining whether to lock a phase corresponding to the maximum CQI statistic value by using the CQI statistic value for locking determination.

4. The method according to claim 3, wherein rotating the phases of the m intermediate regulative signals by using a locked phase corresponding to the maximum CQI statistic value after the phase corresponding to the maximum CQI statistic value is locked.

5. The method according to claim 2, wherein, after outputting the n physical antenna signals through the antennas, the method further comprises:

obtaining a CQI statistic value specific to each user equipment under each rotary phase;

determining a maximum CQI statistic value of each user equipment according to the CQI statistic value specific to each user equipment; and determining a phase corresponding to the maximum CQI statistic value of each user equipment as an optimum phase of the user equipment.

6. The method according to claim 5, wherein, after determining the phase corresponding to the maximum CQI statistic value of each user equipment as the optimum phase of the user equipment, the method further comprises scheduling the user equipment according to a current scheduling algorithm, and when scheduling a first user equipment, setting the optimum phase of the first user equipment according to the optimum phase of the first user equipment.

7. The method according to claim 5, wherein, after determining the phase corresponding to the maximum CQI statistic value of each user equipment as the optimum phase of the user equipment, the method further comprises scheduling the user equipments in order of the magnitude of the optimum phase of each user equipment, and when scheduling the first user equipment, setting the optimum phase of the first user equipment according to the optimum phase of the first user equipment.

8. The method according to claim 1, further comprising setting phases by centering on an existing optimum phase if the optimum phase already exists in a previous working period.

9. The method according to claim 8, further comprising:

upon expiry of a working period, determining whether an Automatic Phase Control (APC) working period expires;

if the APC working period expires, performing a step of updating the value of $\theta_p$ within a $2\pi$ period; and if the APC working period does not expire, performing a step of setting phases to left and right sides of the optimum phase determined in the previous working period;

wherein the APC working period comprises at least one training period, at least two working periods and at least one period of sweeping the phases left and right, wherein the working period is a period of being in the working stage under control, the period of sweeping the phases left and right is equal to (2d+1)*adjustment period of sweeping the phases left and right, and the training period is a period of traversing the phases within a [0, $2\pi$] range to determine and lock the optimum phase.

10. An apparatus for balancing power between antennas, the apparatus comprising:

a matrix processing module, configured to multiply n virtual antenna signals by an orthogonal matrix to obtain n intermediate regulative signals, wherein n is an integer that fulfills n≥2; and a phase rotating module, configured to use a corresponding rotary phase to rotate phases of m of the n intermediate regulative signals, wherein m is an integer that fulfills 1≤m≤n, so that a phase difference exists between at least two of n physical antenna signals output by antennas;

wherein the phase rotating module is configured to use the corresponding rotary phase to rotate the phases of the m of the n intermediate regulative signals by multiplying the m intermediate regulative signals by $e^{j\theta_p}$, wherein $\theta_p$ is a rotary phase corresponding to the m intermediate regulative signals, and p is a sequence number of the intermediate regulative signal, where p∈[1, m].

11. The apparatus for balancing power between antennas according to claim 10, further comprising:

a phase updating module, configured to update the value of $\theta_p$ within a $2\pi$ period when a preset period expires or preset conditions are fulfilled, wherein the value of $\theta_p$ is updated so that $\theta_p$=phase of previous phase rotation+$2\pi$/PhaseNum, wherein PhaseNum is the number of times for updating the value of $\theta_p$ within a preset $2\pi$ period; and wherein the phase rotating module is configured to rotate the phases of the m intermediate regulative signals subsequently by using the updated $\theta_p$.

12. The apparatus for balancing power between antennas according to claim 10, further comprising:

a channel quality indication (CQI) statistic value obtaining module, configured to obtain a CQI statistic value for locking determination under each rotary phase;

a maximum CQI statistic value obtaining module, configured to find a maximum CQI statistic value among all the CQI statistic values obtained for locking determination; and an optimum phase determining module, configured to determine whether to lock a phase corresponding to the maximum CQI statistic value according to the CQI statistic value for locking determination.

13. The apparatus for balancing power between antennas according to claim 12, wherein the phase rotating module is specifically configured to rotate the phases of the m intermediate regulative signals by using a locked phase corresponding to the maximum CQI statistic value after the phase corresponding to the maximum CQI statistic value is locked.

14. The apparatus for balancing power between antennas according to claim 10, further comprising:
   a second CQI statistic value obtaining module, configured to obtain the CQI statistic value specific to each user equipment under each rotary phase;
   a second maximum CQI statistic value obtaining module, configured to find a maximum CQI statistic value specific to each user equipment among the CQI statistic values specific to the user equipments obtained by the second CQI statistic value obtaining module; and
   a second optimum phase determining module, configured to use a phase corresponding to the maximum CQI statistic value specific to each user equipment as the optimum phase of the user equipment.

15. The apparatus for balancing power between antennas according to claim 14, further comprising a second scheduling module, configured to schedule the user equipment according to a current scheduling algorithm, and when scheduling a first user equipment, set the optimum phase of the first user equipment according to the optimum phase of the first user equipment determined by the second optimum phase determining module.

16. The apparatus for balancing power between antennas according to claim 14, further comprising a second scheduling module, configured to schedule the user equipments in order of the magnitude of the optimum phase of each user equipment, and when scheduling the first user equipment, set the optimum phase of the first user equipment according to the optimum phase of the first user equipment determined by the second optimum phase determining module.

17. The apparatus for balancing power between antennas according to claim 10, further comprising:
   a second phase updating module, configured to set phases to left and right sides of the optimum phase determined in a previous working period by centering on the optimum phase determined in the previous working period, wherein the phase rotating module is further configured to perform phase rotation according to the phase set by the second phase updating module.

18. The apparatus for balancing power between antennas according to claim 17, further comprising:
   an automatic phase control (APC) working period judging module, configured to determine whether an APC working period expires upon expiry of a working period, wherein if the APC working period has not expired, the APC working period judging module is configured to start the second phase updating module; and if the APC working period has expired, the APC working period judging module is configured to start the phase updating module,
   wherein the APC working period comprises at least one training period, at least two working periods and at least one period of sweeping the phases left and right, wherein the working period is a period of being in the working stage under control, the period of sweeping the phases left and right is equal to (2d+1)*adjustment period of sweeping the phases left and right, and the training period is a period of traversing the phases within a [0, 2π] range to determine and lock the optimum phase.

19. A base station, comprising an apparatus for balancing power between antennas, wherein the apparatus is configured to:
   multiply n virtual antenna signals by an orthogonal matrix to obtain n intermediate regulative signals, wherein n is an integer that fulfills n≥2; and
   use a corresponding rotary phase to rotate phases of m of the n intermediate regulative signals, wherein m is an integer that fulfills 1≤m≤n, so that a phase difference exists between at least two of n physical antenna signals output by antennas;
   wherein the p apparatus is configured to use the corresponding rotary phase to rotate the phases of the m of the n intermediate regulative signals by multiplying the m intermediate regulative signals by $e^{j\theta_p}$, wherein $\theta_p$ is a rotary phase corresponding to the m intermediate regulative signals, and p is a sequence number of the intermediate regulative signal, where p∈[1, m].

20. The base station according to claim 19, further comprising an antenna, configured to output n physical antenna signals.

* * * * *